United States Patent [19]
Fukuda

[11] Patent Number: 5,868,188
[45] Date of Patent: Feb. 9, 1999

[54] METHOD, SYSTEM AND APPARATUS FOR SAFELY CUTTING A WORKPIECE ON AN INVERTED ROUTER TABLE

[75] Inventor: Mark Sei-Ichi Fukuda, Sugar Land, Tex.

[73] Assignee: Fukuda, Inc., Stafford, Tex.

[21] Appl. No.: 961,894

[22] Filed: Oct. 31, 1997

[51] Int. Cl.⁶ ............... B27B 1/00; B27M 3/00; B27C 5/00

[52] U.S. Cl. ............ 144/372; 144/135.2; 144/137; 144/145.2; 144/144.51; 144/356; 409/110; 409/125

[58] Field of Search ............ 144/134.1, 135.2, 144/137, 144.51, 145.1, 145.2, 356, 371, 372; 409/97, 110, 125, 130; 269/289 R, 307, 909

[56] References Cited

U.S. PATENT DOCUMENTS

| | | | |
|---|---|---|---|
| 2,507,982 | 5/1950 | Krause | 409/110 |
| 4,274,459 | 6/1981 | Galajda | 144/144.51 |
| 5,383,503 | 1/1995 | Johnson | 144/144.51 |

Primary Examiner—W. Donald Bray
Attorney, Agent, or Firm—Paul N. Katz; Ronald L. Chichester; Frohwitter

[57] ABSTRACT

A transparent shield is attached to a template and workpiece and used to move the workpiece against an inverted router blade. The transparent shield prevents inadvertent contact of fingers or hands with the router blade, yet allows visual observation of the workpiece proximate to the router blade. A router table may support the workpiece being cut by the router blade. Handles may be attached to the transparent shield for holding thereof. Sensors in the router table may determine the position of the transparent shield in relation to the router blade and the router blade may be stopped if the transparent shield is not covering the router blade. A video camera may be positioned over the router table. The router table, router blade and transparent shield images may be tracked in relation to one another such that if the transparent shield is not covering the router blade, then the router blade may be stopped. A microprocessor computer system may be used in conjunction with the router table sensors or video camera to control operation of the router blade. A brake may be added to the router blade shaft for quickly stopping the router blade if the transparent shield does not cover the running router blade.

28 Claims, 6 Drawing Sheets

METHOD, SYSTEM AND APPARATUS FOR SAFELY CUTTING A WORKPIECE ON AN INVERTED ROUTER TABLE

BACKGROUND OF THE INVENTION

Field of the Invention

The present invention relates to router operation and safety, and more particularly, in utilizing a transparent shield to hold and position a workpiece against a router blade while preventing inadvertent contact of fingers or hands with the router blade.

Description of the Related Technology

An inverted router blade and table are used to transfer shapes from a template object to a workpiece object. The router blade, typically, has a roller guide which follows the contoured surface of the template and a cutting portion of the router blade removes excess material from the workpiece, wherein the workpiece is formed into the same shapes as the template. The inverted router blade, typically, protrudes vertically from a hole in the table which is horizontal. The workpiece is fixedly attached to the template wherein the workpiece is proximate to the horizontal face of the table and the template is above the workpiece and table face. The router blade is adjusted so that the roller guide is on the same horizontal plane as the template and the cutting portion of the router blade is on the same horizontal plane as the workpiece. The template and workpiece are placed proximate to the roller guide and cutting portion, respectively, and the cutting portion cuts material away from the workpiece in accordance with the position of the roller guide proximate to the template. In this way, very fine and precise patterns may be fabricated in the workpiece.

The router blade spins at a very high speed and is exceedingly sharp. In order to make the fine precision cuts the router blade is capable of doing, the workpiece and template must be handled by an operator within dangerously close distances from the router blade. The least miscalculation in the pressure applied to the workpiece against the router blade may cause the workpiece to kick away from the router blade and may even cause the operator's fingers and/or hand to come into contact with the spinning router blade. Severe lacerations or even amputation of a finger tip may result.

Another problem, besides the danger of physical injury to the operator, is handling and positioning the workpiece and template when the workpiece is small and/or the shapes are complex or intricate. Proper positioning must be maintained at all times or else the workpiece may be ruined. The operator, who may be worrying more about bodily harm than proper positioning of the workpiece, may not be able to concentrate upon the best position for the workpiece in relation to the spinning router blade. Also, intricate patterns cut into the workpiece may cause it to become fragile and easily broken by misapplication of pressure against the router blade.

What is needed is a system, method and apparatus that prevents bodily injury to a router operator, safely holds and allows proper positioning of the workpiece against the router blade by having a clear view thereof, and prevents damage to a fragile workpiece during cutting of the workpiece by the spinning router blade.

SUMMARY OF THE INVENTION

The present invention provides a system, method and apparatus that prevents bodily injury to a router operator, safely holds and allows proper positioning of a workpiece against a router blade by having a clear view thereof, and prevents damage to a fragile workpiece during cutting of the fragile workpiece by the spinning router blade. An embodiment of the invention comprises a transparent shield having planar top and bottom faces, and a thickness smaller in size than a face. At least two handles are attached to the top face, and the bottom face is adapted for attachment to a template. The template is attached to a workpiece and the template is also attached to the bottom face of the transparent shield. The template is positioned between the bottom face of the transparent shield and the workpiece. The template is fixedly attached to the bottom face of the transparent shield and workpiece by some form of attachment means such as glue, tape, screws, vacuum suction, friction and the like. Preferably, double sided, pressure sensitive tape may be used to releasably hold the template to the bottom face of the transparent shield and the workpiece.

Once the workpiece, template and transparent shield are fastened together (hereinafter "the assembly"), the operator may position the assembly on the router table proximate to the router blade. Orientationally, the workpiece is proximate to the face of the router table, the template is above the workpiece and the transparent shield is above the template. The at least two handles attached to the top face of the transparent shield are used by the operator to hold and position the workpiece and template in cooperation with the router blade. The operator has a clear view of the template, workpiece and router blade through the transparent shield while maintaining a safe distance and a barrier (the transparent shield) from the spinning router blade. Since the transparent shield is bigger than the workpiece, and the at least two handles are inset from the edge of the transparent shield, the hands and fingers of the operator cannot come in contact with the spinning router blade even if the workpiece should be kicked away from the spinning router blade.

The present invention allows the operator to be more relaxed while he or she works, knowing that the transparent shield is between the operator's hands and fingers and protects same from injury. Better control of the workpiece is also possible since holding the workpiece is no longer awkward or inconvenient for the operator. Having a clear view of the workpiece and router blade at all times, and better control of the workpiece results in faster, more precise and more productive work without injury.

The present invention is adapted to safely enable the operator to perform all types of router cuts including, but not limited to, male external cuts and female internal cuts in the workpiece, including flush trim, dato, rabbet, chamfer, roundover, spiral and the like.

Another embodiment of the present invention senses the position of the transparent shield relative to the router blade. Whenever the transparent shield does not completely cover the router blade, the invention stops the router blade, thus, preventing inadvertent contact by the operator with the spinning router blade. Sensors in the router table may sense the edges of the transparent shield, and if an edge of the transparent shield should pass over the router blade, the router blade will be stopped. Magnetic or radio frequency absorptive or reflective material may be attached to the edges of the transparent shield around the circumference thereof. Wherein the absorptive or reflective material along the transparent shield edges will cause the sensors in the router table to sense the position of the transparent shield in relation to the router blade. The transparent shield may also be impregnated with an absorptive or reflective material that modifies the detection fields of the sensors embedded in the router table so that the sensors may determine the area being covered by the transparent shield. When a portion of the transparent shield area does not cover the router blade, the router blade is stopped.

Yet another embodiment of the present invention comprises a video camera positioned above the router table and a computer system that processes the video images from the video camera. In these video images, the relative positions of the router blade and the transparent shield are apparent. The computer system determines whenever the transparent shield does not completely cover the spinning router blade and will stop the spinning router blade. The video camera may be offset from directly above the router blade so that the operator may lean over the transparent shield for better viewing of the workpiece and router blade. A plurality of video cameras may also be used above and offset from the router blade for three dimensional observation of the position of the transparent shield in relation to the spinning router blade. Whenever the transparent shield does not completely cover the spinning router blade, the router blade will be stopped.

The transparent shield may be coated with an infrared or ultraviolet absorptive or reflective coating. An infrared or ultraviolet light may illuminate the transparent shield and router table. The video camera can detect the infrared or ultraviolet light absorbed or reflected from the transparent shield and determine if the transparent shield does not completely cover the spinning router blade. A phosphor coating that glows under ultraviolet light may also be applied to the transparent shield so that the shield glows un ultraviolet light illumination. The video camera may use a lens filter to accentuate the ultraviolet light illuminated transparent shield, thus making positional tracking easier.

A brake arrangement may also be included on the shaft of the router blade drive for rapidly stopping the spinning router blade. The transparent shield, video camera(s) and computer system may be easily adapted and installed on existing inverted router blade table systems so as to greatly enhance safety to the operator, and improve the quality and quantity of product produced during a work day.

An advantage of the present invention is that injury to an operator of an inverted router table is greatly reduced or eliminated.

Another advantage is that a workpiece may be more conveniently held for positioning proximate to a spinning router blade.

Another advantage is that the operator has a clear and unobstructed view of a workpiece in relation to a spinning router blade.

A feature of the present invention is handles attached to a face of the transparent shield for an operator to obtain a good hold for better positioning and control of the workpiece in relation to the router blade.

Another feature is removably attaching the workpiece, template and transparent shield together with glue, screws, double sided tape, vacuum suction, pins, tongue and groove, and the like.

Still another feature is stopping a spinning router blade whenever the transparent shield does not completely cover the router blade.

Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
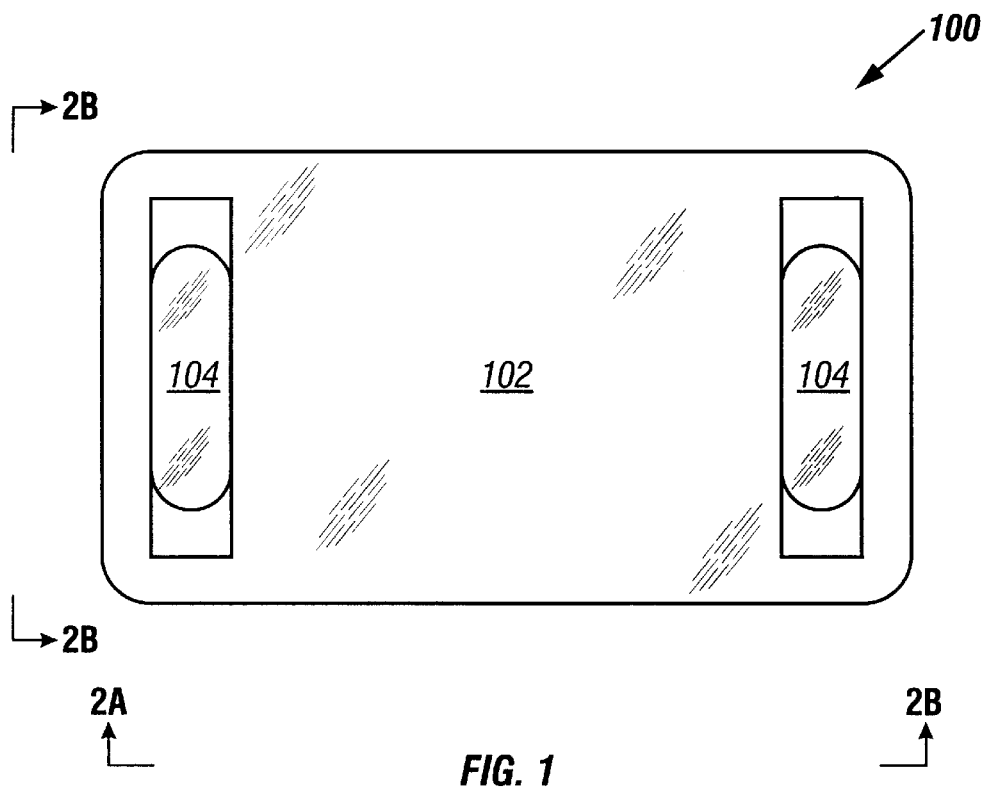
FIG. 1 is a schematic plan view of an embodiment of a transparent shield, according to the present invention.

The present invention is a system, method and apparatus, for safely holding and positioning a workpiece and template proximate to a router blade. A transparent shield having handles attached thereto is adapted to be attached to a router template which is also attached to a workpiece. The transparent shield, template and workpiece attached together form an assembly which is easily and safely handled by an operator so that the workpiece may be cut to desired shapes according to the shapes of the template attached thereto. The present invention is adapted to safely enable the operator to perform all types of router cuts including, but not limited to, male external cuts and female internal cuts in the workpiece, including flush trim, dato, rabbet, chamfer, roundover, spiral and the like. The transparent shield also completely covers the router blade, thus preventing inadvertent contact by the operator with the spinning router blade. Higher quality and quantity of products produced during a work day, and with a significant reduction in the possibility of injury are accomplished with the present invention because the operator has better control of the position of the workpiece with clear visual access thereto. In addition, the operator has greatly reduced anxiety about getting hurt by an exposed spinning router blade. Automatic stopping of the spinning router blade when the transparent shield does not completely cover the router blade is contemplated herein for the present invention.

Referring now to the drawings, the details of preferred embodiments of the present invention are schematically illustrated. Like elements in the drawings will be represented by like numbers, and similar elements will be represented by like numbers with a different lower case letter suffix.

Figure 2A:
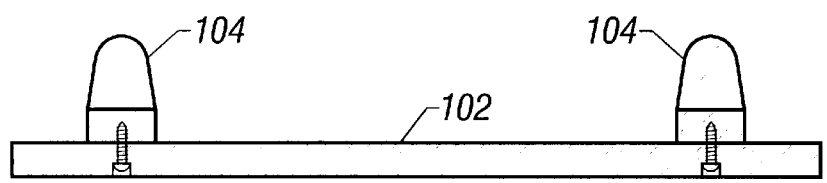
FIGS. 2A and 2B are schematic elevational views of the transparent shield illustrated in FIG. 1.
Figure 2B:
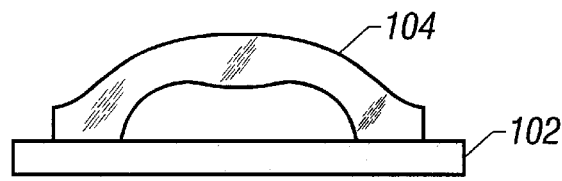
Figure 3:
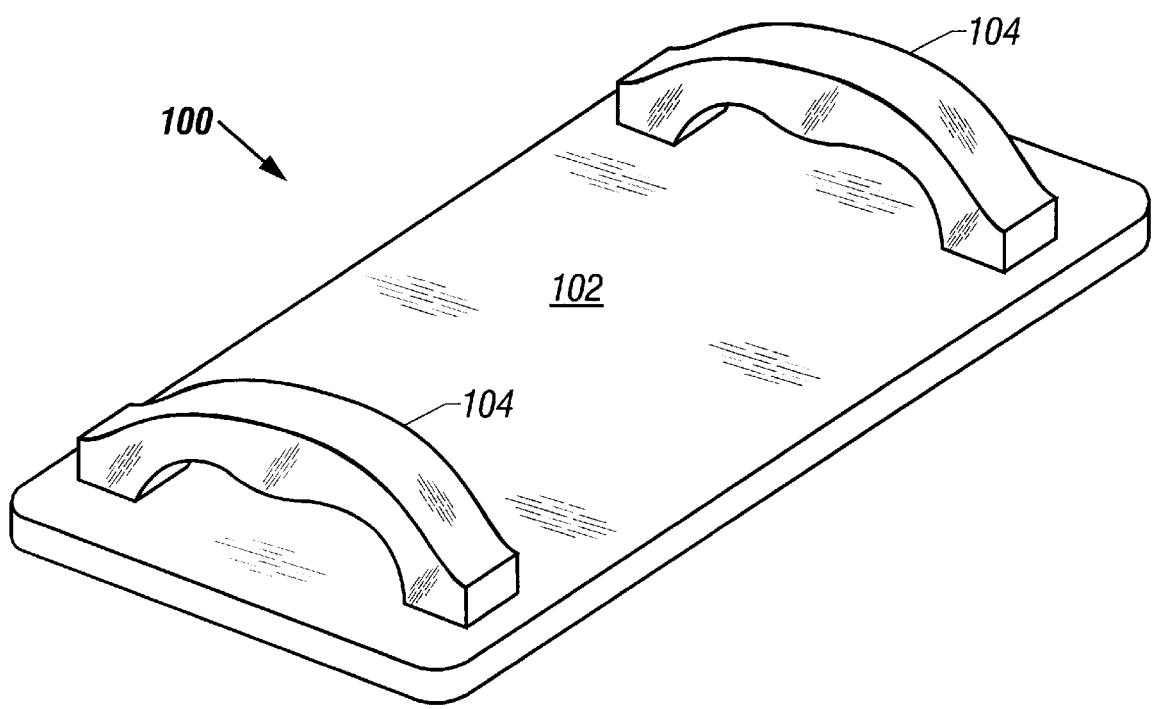
FIG. 3 is a schematic orthogonal view of the transparent shield of FIGS. 1, 2A and 2B.

Referring to FIG. 1, a schematic plan view of an embodiment of a transparent shield, according to the present invention is illustrated. The transparent shield is generally indicated by the numeral 100 and comprises a transparent planar member 102 and handles 104 attached to the planar member 102. The transparent planar member 102 may be made of any material that is substantially transparent, has sufficient rigidity, and will not shatter. Typical materials for the transparent planar member 102 may be, but are not limited to, polycarbonate (LEXANT™), acrylic (PLEXIGLASS™), and the like. FIGS. 2A and 2B are elevational views of the transparent shield 100 illustrated in FIG. 1, taken along the lines 2A—2A and 2B—2B, respectively. The handles 104 may be made from any type of material, based upon strength and cost, such as, but not limited to, wood, plastic, carbon composite, fiberglass, metal and the like. FIG. 3 is a schematic orthogonal view of the transparent shield 100 illustrated in FIGS. 1, 2A and 2B.

Figure 4:
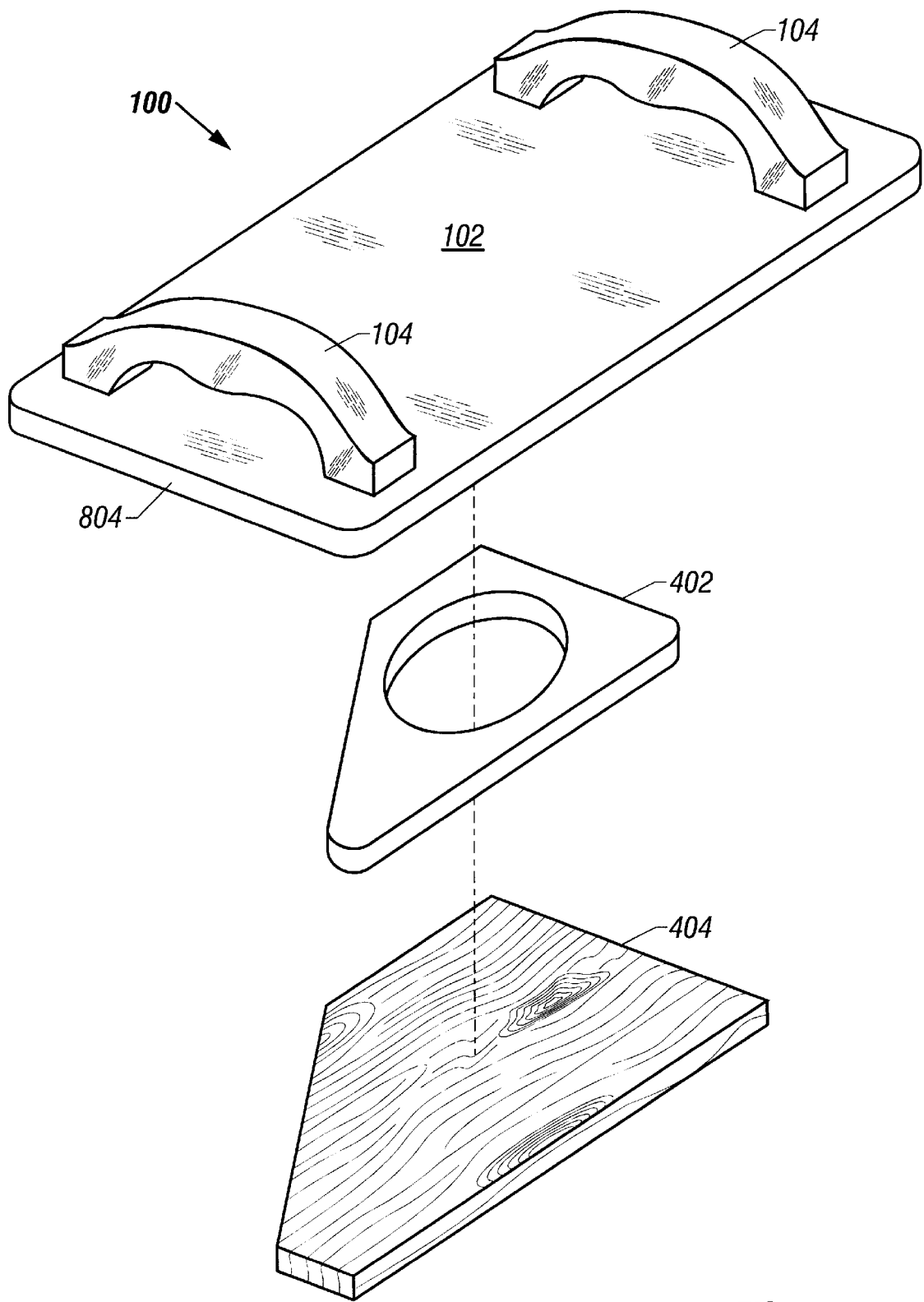
FIG. 4 is a schematic exploded orthogonal view of a workpiece, template and transparent shield, according to the present invention.

Referring now to FIG. 4, a schematic exploded orthogonal view of a workpiece 404, a template 402 and the transparent shield 100 is illustrated. The template 402 is attached to the face of the transparent shield 100 opposite the face on which the handles 104 are attached. The workpiece 404 is attached to the template 402 such that the template 402 is between the transparent shield 100 and the workpiece 404. The template 402, illustrated in FIG. 4, is for external male cuts, but the appropriate template may be used for internal female cuts.

Figure 5:
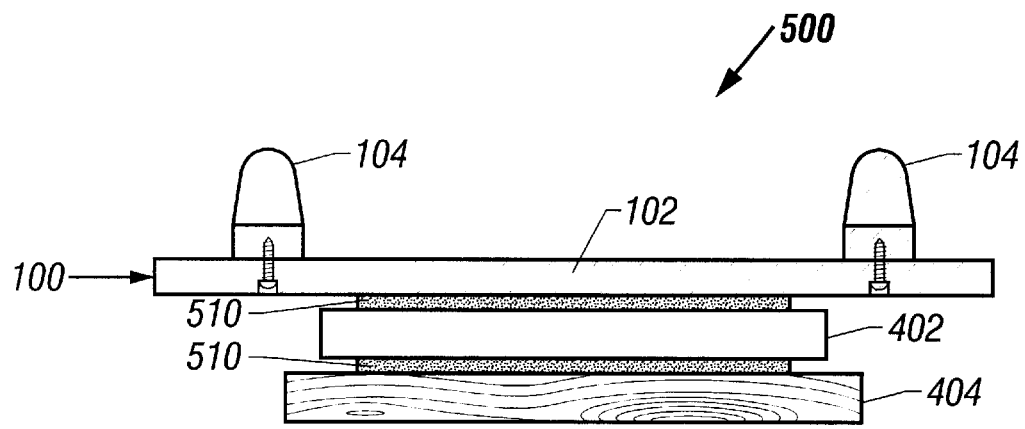
FIG. 5 is a schematic elevational view of the workpiece, template and transparent shield of FIG. 4 attached together.

Referring now to FIG. 5, a schematic elevational view of the workpiece 404, the template 402 and the transparent shield 100 of FIG. 4 is illustrated attached together. Double sided pressure sensitive tape 510 is illustrated, but any fastening means known to those skilled in the art of temporarily attaching materials together may be used with the present invention and is contemplated herein. Fastening means may be, but are not limited to, for example: double sided tape, screws, glue, vacuum, friction, VELCRO™, pins, pegs, tongue and groove, and the like. The purpose of removably attaching the workpiece 404, the template 402 and the transparent shield 100 together is to form an assembly 500 which may be easily and safely handled by the router operator when cutting the workpiece 404 on the inverted router table.

Figure 6:
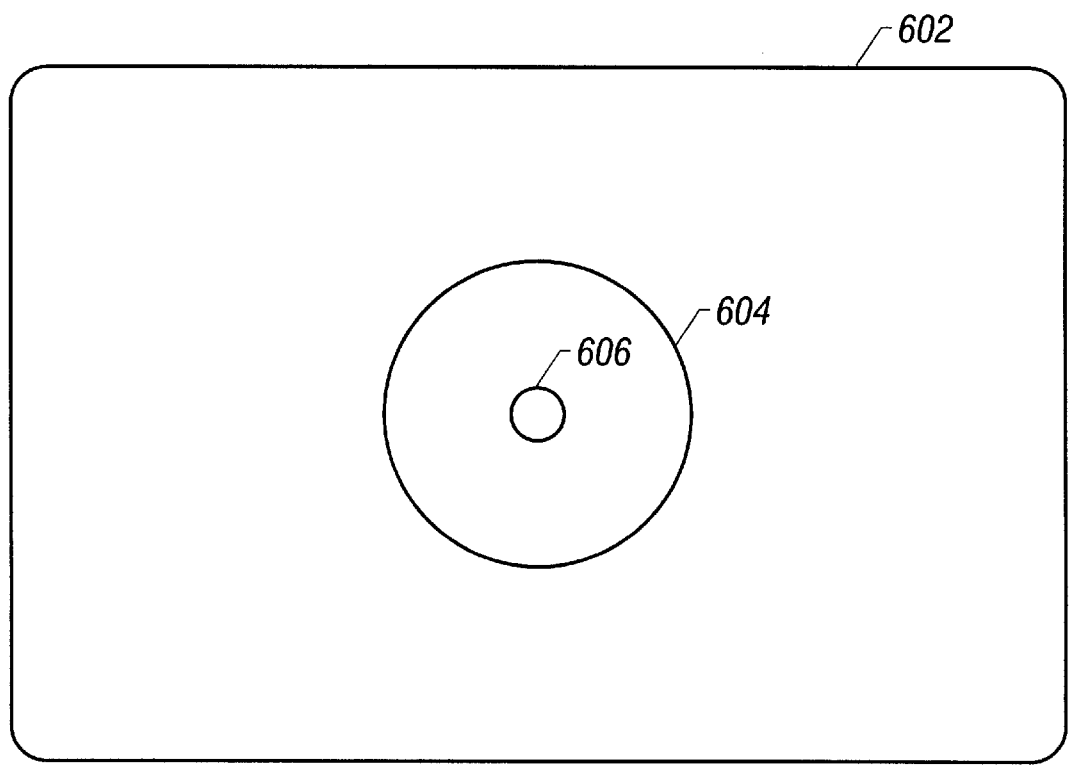
FIG. 6 is a schematic plan view of a router table and router blade.

Referring now to FIG. 6, a schematic plan view of a router table and router blade is illustrated. The router table 602 has a circular hole 604 therein. A router blade 606 is located in the circular hole 604. The router blade 606 may be adjusted vertically (perpendicular to the face of the router table) from below the surface of the table 602 (stowed) to whatever height is required to interface with the template 402 and the workpiece 404. A motor (not illustrated) is used to turn the router blade 606 at high speeds. A vacuum suction may be used through the circular hole 604 for removal of particles resulting from the router blade 606 removing material from the workpiece 404. This vacuum suction may also be used to assist in keeping the workpiece 404, template 402 and transparent shield 100 proximate and stable with the router table 602.

Figure 7:
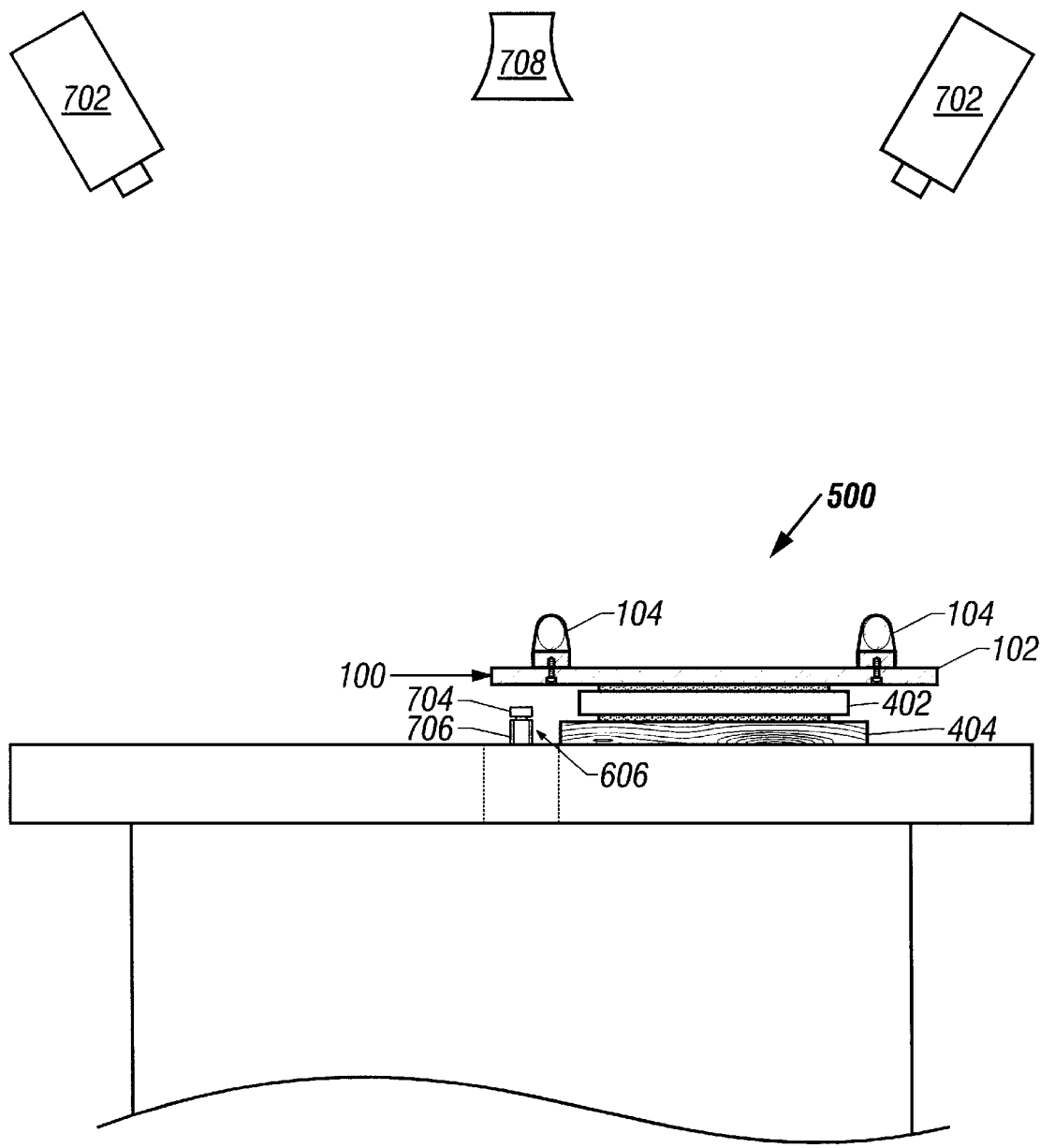
FIG. 7 is a schematic elevational view of a router table, workpiece, template, transparent shield and video camera(s), according to the present invention.

Referring now to FIG. 7, a schematic elevational view of the router table 602, the assembly 500 (workpiece 404, template 402 and transparent shield 100 attached together) and video camera(s) 702 is illustrated. The router blade 606 comprises a guide bearing 704 which follows the surface of the template 402 and cutting edges 706 which remove material from the workpiece 404. The operator grasps the handles 104 of the transparent shield 100 and moves the assembly 500 so as to place the template 402 and the workpiece 404 proximate to the guide bearing 704 and cutting edges 706, respectively. The operator moves the template 402 against the guide bearing 704 with a smooth and even pressure. The workpiece 404 is cut by the cutting edges 706 to the exact shape of the template 402. The operator may easily observe, through the transparent shield 100, the condition of the template 402, workpiece 404 and router blade 606 and make physical alignment adjustments without fear or apprehension of injury.

The video camera(s) observes the position of the transparent shield 100 in relation to the router blade 606. Whenever the transparent shield 100 does not adequately cover the router blade 606, the router blade 606 may be stopped. An ultra-violet light 708 may illuminate the transparent shield 100 which may also be coated with a reflective or absorptive ultra-violet coating. By illuminating the transparent shield 100 with ultra-violet light, the camera(s) 702 may more easily see the position thereof.

Figure 8:
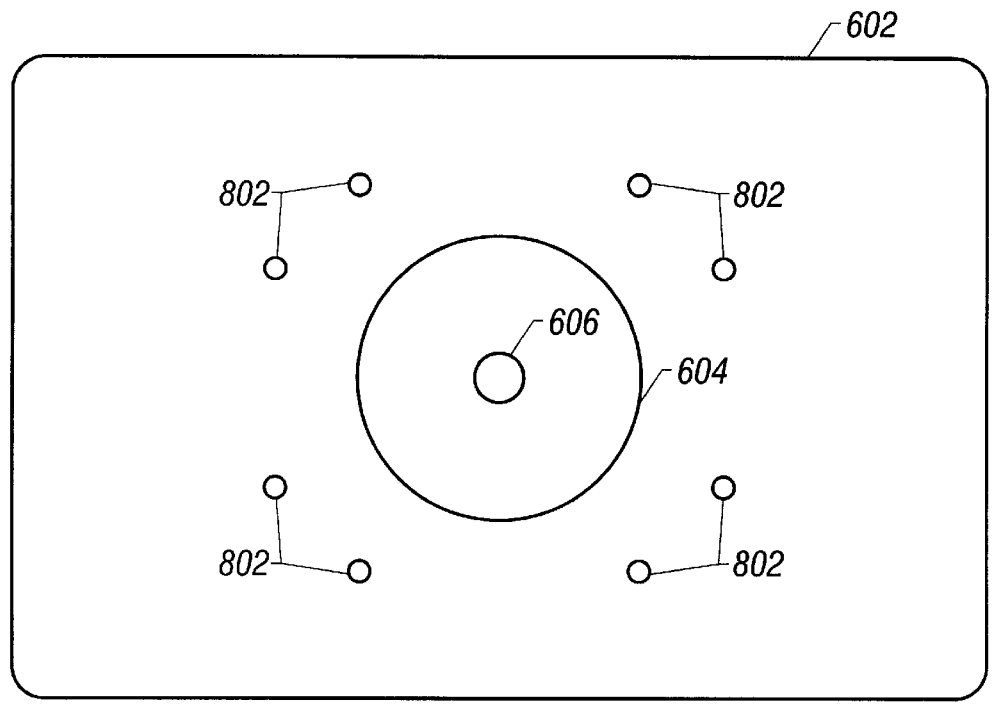
FIG. 8 is a schematic plan view of the router table of FIG. 6 having embedded sensors therein, according to the present invention.

Referring to FIG. 8, a schematic plan view of the router table of FIG. 6 having embedded sensors therein is illustrated. Embedded sensors 802 surround the router blade 606. The sensors 802 may be actuated by changes in a magnetic field, a radio frequency field, an ultrasonic field, and the like. The transparent shield 100 may have a strip 804 (FIG. 4) on the edge of the planar member 102 that affects the sensors 802 so that when an edge of the transparent shield 100 passes over a sensor(s) 802, the sensor(s) 802 detects the edge and alarms or causes the router blade 606 to be stopped. The strip 804 may be made of absorptive or reflective material which may be detected by magnetic sensors, radio frequency sensors, ultrasonic sensors and the like. The material comprising the transparent shield 100 may also be impregnated with reflective or absorptive material which can be detected by the sensors 802 wherein the transparent shield 100 must cover the sensors 802 or else the router blade 606 is stopped.

Figure 9:
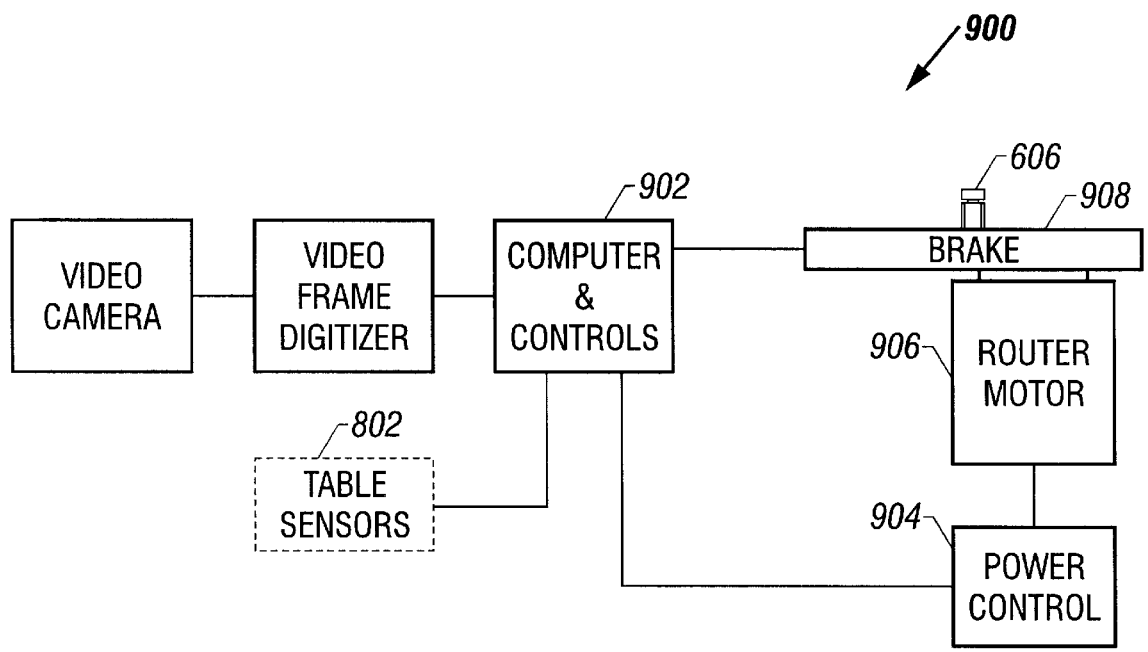
FIG. 9 is a schematic block diagram of a computer system, and video camera(s) and sensors illustrated in FIGS. 7 and 8, respectively.

Referring now to FIG. 9, a schematic block diagram of the present invention comprises a computer system, and the video camera(s) 702 and sensors 802 of FIGS. 7 and 8, respectively, is illustrated. The computer control system is generally represented by the numeral 900 and comprises a computer and controls 902, power control 904, a brake 908, sensors 802, and/or the video camera(s) 702 and a video frame digitizer 910. The computer and controls 902 controls the power control 904 with turns on and off the router motor 906 which turns the router blade 606. The brake 908 is optionally included to stop the spinning router blade 606 and may be controlled by the computer and controls 902.

The video camera(s) 702 receives an image of the router blade 606 and the transparent shield 100. The video frame digitizer 910 converts the video information from the video camera(s) 702 into digital video information usable by the computer 902. The computer 902 uses this digital video information in determining whether the transparent shield 100 is properly covering the router blade 606. If the digital information indicates that the router blade 606 is exposed such that it could harm the operator, the computer 902 signals the power control 904 to shut off the router motor 906, and optionally engage the brake 908 to more quickly stop the spinning router blade 606. Alternatively, or in addition, the sensors 802 may detect the position of the transparent shield 100 such that when the router blade 606 becomes dangerously exposed, the computer 902 shuts off the router motor 906 as described above.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A system for safely and accurately cutting a workpiece on an inverted router table, said system comprising:
   a transparent shield, said transparent shield being planar and having a top face and a bottom face;
   at least two handles attached to the top face of said transparent shield;
   a template having a top face and a bottom face, the top face of said template attached to the bottom face of said transparent shield;
   a workpiece having a top face and a bottom face, the top face of said workpiece attached to the bottom face of said template;
   a router table having an inverted router blade therein; and
   said workpiece bottom face being in contact with said router table and said workpiece edge being proximate to said inverted router blade, wherein said transparent shield, template and workpiece may be controlled by an operator grasping said at least two handles such that shapes in are formed said workpiece according to the shapes of said template.

2. The system of claim 1, wherein said at least two handles are inset from the edge of said transparent shield.

3. The system of claim 1, wherein said transparent shield, template and workpiece are attached with double-sided, pressure sensitive adhesive tape.

4. The system of claim 1, wherein said transparent shield, template and workpiece are attached with glue.

5. The system of claim 1, wherein said transparent shield, template and workpiece are attached with screws.

6. The system of claim 1, wherein said transparent shield, template and workpiece are attached with pins.

7. The system of claim 1, wherein said transparent shield, template and workpiece are attached with a vacuum suction.

8. The system of claim 1, wherein said transparent shield, template and workpiece are attached with dowels.

9. The system of claim 1, wherein said transparent shield is made of polycarbonate.

10. The system of claim 1, wherein said transparent shield is made of acrylic.

11. The system of claim 1, wherein said at least two handles are made of plastic.

12. The system of claim 1, wherein said at least two handles are made of wood.

13. The system of claim 1, wherein said at least two handles are made of carbon composite material.

14. The system of claim 1, further comprising a video camera over said router table for monitoring the position of said transparent shield in relation to said inverted router blade and producing electronic video images thereof.

15. The system of claim 14, further comprising:
   a video frame digitizer connected to said video camera, said video frame digitizer digitizing the electronic video images from said video camera;
   a computer connected to said video frame digitizer, said computer determining when said transparent shield is not covering said inverted router blade by comparing the digital video images of said transparent shield and said inverted router blade; and
   a router blade motor shutoff circuit for stopping rotation of said inverted router blade, said router blade motor shutoff connected to said computer such that said computer signals said router blade motor shutoff circuit when said transparent shield is not covering said inverted router blade.

16. The system of claim 14, further comprising a light source over said router table.

17. The system of claim 16, further comprising a reflective coating on the top face of said transparent shield for reflecting said light source.

18. The system of claim 14, wherein said light source is an ultraviolet light source.

19. The system of claim 16, further comprising an absorptive coating on the top face of said transparent shield for absorbing said light source.

20. The system of claim 1, further comprising sensors in said router table for detecting the position of said transparent shield.

21. The system of claim 20, further comprising a strip around the edge of said transparent shield, wherein the strip is made of a material which can be detected by said sensors.

22. The system of claim 20, further comprising a material impregnated in said transparent shield, wherein the material can be detected by said sensors.

23. The system of claim 20, further comprising a router blade motor shutoff circuit for stopping rotation of said inverted router blade, said router blade motor shutoff connected to said sensors such that when said transparent shield is not covering said inverted router blade, said router blade motor shutoff stops said inverted router blade.

24. A method for safely and accurately cutting a workpiece on an inverted router table, said method comprising the steps of:
   providing a transparent shield, said transparent shield being planar and having a top face and a bottom face;
   attaching at least two handles to the top face of said transparent shield;
   attaching a template to the bottom face of the transparent shield;
   attaching a workpiece to the template opposite the attachment to the transparent shield;
   providing a router table having an inverted router blade therein;
   placing the workpiece in contact with the router table wherein the workpiece edge is proximate to the inverted router blade; and controlling the position of the transparent shield, template and workpiece by an operator grasping the at least two handles and moving the transparent shield attached to the template which is attached to the workpiece such that the inverted router blade forms shapes in the workpiece according to the shapes of the template.

25. The method of claim 24, further comprising the step of monitoring the position of the transparent shield in relation to the inverted router blade.

26. The method of claim 25, further comprising the step of stopping rotation of the router blade when the transparent shield does not cover the inverted router blade.

27. The method of claim 24, wherein the steps of attaching are the steps of attaching with double-sided, pressure sensitive adhesive tape.

28. An apparatus for safely and accurately cutting a workpiece on an inverted router table, said apparatus comprising:
   a transparent shield, said transparent shield being planar and having a top face and a bottom face;
   at least two handles attached to the top face of said transparent shield;

said transparent shield bottom face adapted for being removably attachable to a template which is attached to a workpiece; and said transparent shield being controllable by an operator grasping said at least two handles such that shapes are formed in said workpiece according to the shapes of said template when placed against an inverted router blade.

* * * * *